(12) United States Patent
Kim et al.

(10) Patent No.: US 8,761,092 B2
(45) Date of Patent: Jun. 24, 2014

(54) COLLABORATIVE MIMO USING SOUNDING CHANNEL IN MULTI-CELL ENVIRONMENT

(75) Inventors: Jae Wan Kim, Anyang-si (KR); Wook Bong Lee, Anyang-si (KR); Su Nam Kim, Anyang-si (KR); Dong Guk Lim, Anyang-si (KR); Bin Chul Ihm, Anyang-si (KR)

(73) Assignee: LG Electronics, Seoul (KR)

(*) Notice: Subject to any disclaimer, the term of this patent is extended or adjusted under 35 U.S.C. 154(b) by 0 days.

(21) Appl. No.: 12/453,562

(22) Filed: May 14, 2009

(65) Prior Publication Data

US 2010/0002607 A1    Jan. 7, 2010

Related U.S. Application Data

(60) Provisional application No. 61/078,452, filed on Jul. 7, 2008.

(30) Foreign Application Priority Data

Nov. 14, 2008    (KR) .................. 10-2008-0113284

(51) Int. Cl.
*H04J 3/00* (2006.01)
*H04W 4/00* (2009.01)

(52) U.S. Cl.
USPC ........... 370/329; 370/280; 370/252; 370/208; 370/465; 375/267; 375/260; 455/273; 455/571

(58) Field of Classification Search
CPC .............. H04J 3/00; H04W 4/00; H04B 7/02; H04B 7/043; H04B 7/024; H04B 7/0639
USPC ......... 370/280, 329, 252, 208, 338, 465, 334; 375/267, 260, 299, 340; 455/273, 571, 455/127.1
See application file for complete search history.

(56) References Cited

U.S. PATENT DOCUMENTS 6,603,971 B1 * 8/2003 Mohebbi ..................... 455/437
6,665,521 B1    12/2003 Gorday et al.
(Continued)

FOREIGN PATENT DOCUMENTS

JP    2006-500873 A    1/2006
JP    2007510390 A    4/2007
(Continued)

OTHER PUBLICATIONS

Mai Vu et al., "MIMO Wireless Linear Precoding", IEEE Signal Processing Magazine, Sep. 2007, pp. 86-105.
(Continued)

*Primary Examiner* — Jamal Javaid
(74) *Attorney, Agent, or Firm* — Mckenna Long & Aldridge LLP (57) ABSTRACT

A collaborative MIMO method using a sounding channel in a multi-cell environment is disclosed. The method includes acquiring, by a first base station providing a service for a first cell, first CSI of a first downlink channel between the first base station and a mobile station, transmitting, to a second base station, a signal including information requesting that the second base station providing a service for a second cell acquire second CSI of a second downlink channel between the second base station and the mobile station, and acquiring, by the second base station, the second CSI. The mobile station is served by the first base station.

3 Claims, 5 Drawing Sheets

(56) References Cited

U.S. PATENT DOCUMENTS

| | | | |
|---|---|---|---|
| 7,852,811 B2 * | 12/2010 | McCoy | 370/334 |
| 8,331,308 B1 * | 12/2012 | Au et al. | 370/330 |
| 2002/0172217 A1 * | 11/2002 | Kadaba et al. | 370/443 |
| 2004/0063430 A1 | 4/2004 | Cave et al. | |
| 2004/0225740 A1 | 11/2004 | Klemba et al. | |
| 2006/0034165 A1 * | 2/2006 | Levy | 370/208 |
| 2007/0015511 A1 * | 1/2007 | Kwun et al. | 455/436 |
| 2007/0248172 A1 * | 10/2007 | Mehta et al. | 375/260 |
| 2007/0280340 A1 * | 12/2007 | Hwang et al. | 375/222 |

FOREIGN PATENT DOCUMENTS

| | | |
|---|---|---|
| JP | 2008519566 A | 6/2008 |
| JP | 2010-537520 A | 12/2010 |
| KR | 10-2004-0045875 | 6/2004 |
| KR | 10-2007-0086675 | 8/2007 |
| KR | 10-2007-0086976 A | 8/2007 |
| KR | 10-2007-0116302 A | 12/2007 |
| KR | 10-2008-0007174 A | 1/2008 |
| WO | 2007046621 A1 | 4/2007 |
| WO | 2008055179 A2 | 5/2008 |

OTHER PUBLICATIONS

Alcatel Shanghai Bell, Alcatel-Lucent, Collaborative MIMO for LTE-A downlink, 3GPP TSG-RAN WG1 Meeting #153bis, Warsaw, Poland, Jun. 30-Jul. 4, 2008, R1-082501.

NEC Group, Uplink Synchronization Maintenance, 3GPP TSG RAN WG1 Meeting #49, Kobe, Japan, May 7-11, 2007, R1-072113.

Mitsubishi Electric Research Laboratories Cambridge, Massachusetts USA, UL SRS Control Signaling for Antenna Selection (AS)[online], 3GPP TSG-RAN WG1#52 R1-080803 (Feb. 11-15, 2008); Sorrento, Italy.

NEC Group, Uplink Synchronization Maintenance [online], 3GPP TSG RAN WG1 Meeting 349 R1-072113, May 2, 2007 Collaborative MIMO (Alcatel-Lucent).

* cited by examiner

----→ Feedback

COLLABORATIVE MIMO USING SOUNDING CHANNEL IN MULTI-CELL ENVIRONMENT

CROSS REFERENCE TO RELATED APPLICATIONS

The present application claims priority to U.S. Provisional Application Ser. No. 61/078,452, filed on Jul. 7, 2008, the entire contents of which are incorporated herein by reference.

This application claims the benefit of the Korean Patent Application No. 10-2008-0113284, filed on Nov. 14, 2008, which is hereby incorporated by reference as if fully set forth herein.

BACKGROUND OF THE INVENTION

1. Field of the Invention

The present invention relates to a mobile communication system, and more particularly, to a method for performing collaborative multiple-input multiple-output (MIMO) in a mobile communication system and a method for acquiring channel status information necessary for the same.

2. Discussion of the Background Art

Recently, a MIMO system has attracted attention as a wideband wireless mobile communication technology. The MIMO system serves to raise spectrum efficiency in proportion to the number of antennas, which is difficult to achieve in a communication technique employing a conventional single-input single-output (SISO) scheme.

MIMO technology refers to a multiple antenna technique for implementing high-speed communication using a plurality of antennas. The MIMO technology is classified into a spatial multiplexing scheme and a spatial diversity scheme, according to whether the same data is transmitted or different data is transmitted.

In the spatial multiplexing scheme, different data is simultaneously transmitted through multiple transmit/receive antennas. Namely, a transmitting side transmits different data using transmit antennas and a receiving side discriminates the transmitted data through interference elimination and signal processing, thereby improving transmission rate in proportion to the number of transmit antennas.

The spatial diversity scheme serves to obtain transmit diversity by transmitting the same data using multiple transmit antennas. The spatial diversity scheme is a kind of a space-time channel coding scheme. The spatial diversity scheme can maximally obtain a transmit diversity gain (performance gain) by transmitting the same data through multiple transmit antennas. The spatial diversity scheme, however, is not a method for improving the transmission rate but a method for improving the reliability of transmission by the diversity gain.

The MIMO technology may be divided into an open-loop type (e.g., Bell labs layered space-time (BLAST), space-time trellis code (STTC), etc.) and a closed-loop type (e.g., transmit adaptive array (TxAA), etc.) according to whether channel information is fed back from a receiving side to a transmitting side.

The MIMO technology may also be divided into a single-user MIMO and a multi-user MIMO according to the number of users. The single-user MIMO is performed between one mobile station having two or more antennas and a base station having two or more antennas. The multi-user MIMO is performed between two or more mobile stations each having one antenna and one base station having a plurality of antennas. The multi-user MIMO has the following advantages. First, since the mobile station needs only one transmit path, only one power amplifier is required. Further, even though one mobile station operates with another mobile station in MIMO mode, since one mobile station transmits data through one antenna, an output of the mobile station does not need to be divided according to antennas. Hence, the multi-user MIMO is not subject to a 3-dB loss generated in general MIMO. Second, a much better channel matrix can be obtained by properly selecting the two mobile stations than installing two antennas within one mobile station. According to the multi-user MIMO, since a lower correlation between user antennas is expected by simultaneously considering a plurality of users, a better type of channel characteristic matrix can be obtained.

Figure 1:
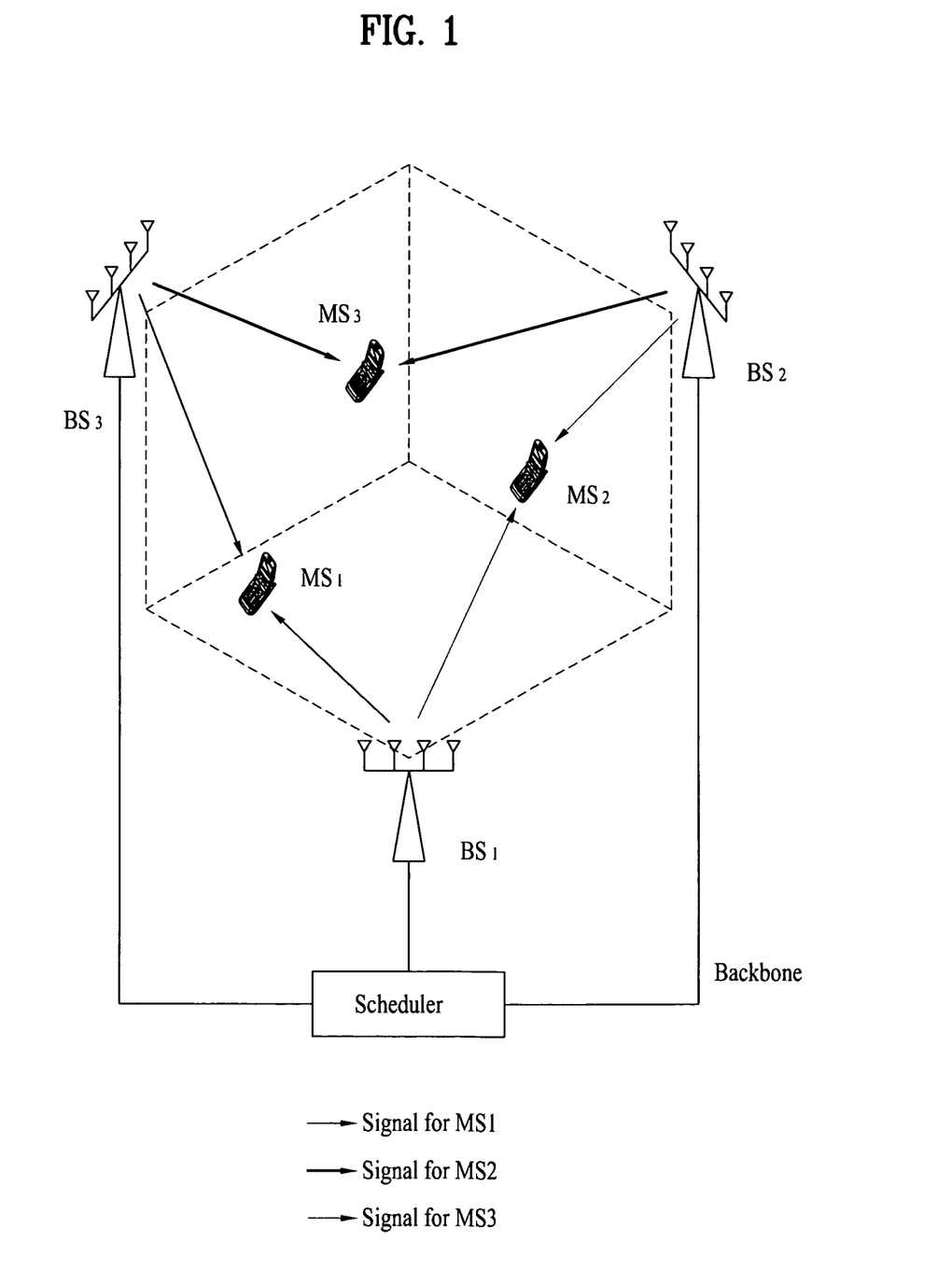
FIG. 1 illustrates a conventional method for raising reception performance of a user in an edge of a cell using a plurality of base stations in a multi-cell environment.

As contrasted with the conventional MIMO applied to a single cell to achieve diversity, single-user MIMO, or multi-user MIMO, collaborative MIMO serves to raise reception performance of users in edges of a cell using a plurality of base stations in a multi-cell environment as illustrated in FIG. 1. A mobile station can increase reception performance by single-user MIMO or multi-user MIMO through multiple antennas of a base station of the same cell. A mobile station, as illustrated in FIG. 1, in an edge of a cell which is liable to be influenced by interference from neighbor cells receives a signal for the same channel from neighbor base stations, thereby implementing collaborative MIMO of diversity or spatial multiplexing (SM).

The mobile station can commonly receive data from multi-cell base stations using a collaborative MIMO system. To improve system performance, each base station can simultaneously support one or more mobile stations $MS_1$, $MS_2$, ..., $MS_k$ using the same radio frequency resource. The base station can perform spatial division multiple access (SDMA) based on channel state information between the base station and the mobile station.

In collaborative MIMO, a serving base station and one or more collaborative base stations are connected to a scheduler through a backbone network. The scheduler may be operated by receiving channel state information between the respective mobile stations $MS_1$, $MS_2$, ..., $MS_k$ and collaborative base stations, which is measured by respective base stations $BS_1$, $BS_2$, ..., $BS_M$ through the backbone network. For example, the scheduler schedules information for a collaborative MIMO operation with respect to the serving base station and one or more collaborative base stations. Namely, the scheduler directly instructs the respective base stations to perform a collaborative MIMO operation.

Each mobile station using collaborative MIMO. reports information necessary for the collaborative MIMO operation only to the serving base station and does not report the information to the collaborative base stations. The serving base station transmits feedback information to the scheduler through the backbone network. The scheduler provides information for the collaborative MIMO operation to the collaborative base stations through the backbone network. In this case, the mobile station in an edge of a cell should transmit information about the serving base station and the collaborative base stations, demanded for the collaborative MIMO operation, together with the information for the collaborative MIMO operation, to the serving base station. Therefore, feedback overhead may be increased.

SUMMARY OF THE INVENTION

An object of the present invention devised to solve the problem lies in providing a method for performing collaborative MIMO and a method for efficiently acquiring channel state information and reducing feedback overhead.

The object of the present invention can be achieved by providing a method for receiving, by a specific mobile station, a signal by a collaborative MIMO scheme in a multi-cell environment. The method includes transmitting an uplink sounding signal to a serving base station and collaborative base stations, wherein the collaborative base stations include at least one neighbor base station for performing collaborative MIMO together with the serving base station, and receiving a signal using a multi-user preceding matrix, wherein the multi-user precoding matrix is calculated by the collaborative base stations using the uplink sounding signal with respect to mobile stations receiving a service from the collaborative base stations. The multi-user precoding matrix may be acquired by estimating channel state information (CSI) using the uplink sounding signal received by the collaborative base stations from the specific mobile station, and calculating the multi-user preceding matrix using the estimated CSI.

The CSI may be state information about a downlink channel for the specific mobile station to receive a signal by the collaborative MIMO scheme.

In another aspect of the present invention, provided herein is a method for transmitting, by a specific base station, a signal together with one or more collaborative base stations by a collaborative MIMO scheme. The method includes receiving an uplink sounding signal from a specific mobile station, estimating channel state information (CSI) of mobile stations receiving a service from the collaborative base stations using the uplink sounding signal, calculating a multi-user preceding matrix of the mobile stations using the estimated CSI, and transmitting a signal using the calculated multi-user precoding matrix by the collaborative MIMO scheme.

The estimating the CSI may be supported in a time division duplexing (TDD) system.

In a further aspect of the present invention, provided herein is a method for acquiring channel state information (CSI) between a mobile station and two or more base stations in a wideband wireless mobile communication system. The method includes acquiring, by a first base station providing a service for a first cell, first CSI of a first downlink channel between the first base station and the mobile station, transmitting, to a second base station, a signal including information requesting that the second base station providing a service for a second cell acquire second CSI of a second downlink channel between the second base station and the mobile station, and acquiring, by the second base station, the second CSI, wherein the mobile station is served by the first base station.

The method may further include transmitting, by the first base station, an instruction signal to the mobile station, wherein the instruction signal includes information instructing the mobile station to transmit a first sounding signal through a first sounding channel between the first base station and the mobile station and to transmit a second sounding signal through a second sounding channel between the second base station and the mobile station.

The mobile station may transmit a first sounding signal through a first sounding channel between the first base station and the mobile station and transmit a second sounding signal through a second sounding channel between the second base station and the mobile station, the first base station may acquire the first CSI based on the first sounding signal transmitted from the mobile station, and the second base station may acquire the second CSI based on the second sounding signal transmitted from the mobile station. A second-dimensional time-frequency resource allocated to the first sounding channel may be the same as a second-dimensional time-frequency resource allocated to the second sounding channel. The first sounding channel and the second sounding channel may be identical.

The first base station may acquire the first CSI by measuring a first uplink channel between the first base station and the mobile station, and the second base station may acquire the second CSI by measuring a second uplink channel between the second base station and the mobile station.

The first CSI and the second CSI may be used to perform collaborative MIMO.

In another aspect of the present invention, provided herein is a method for performing collaborative MIMO in a wideband wireless mobile communication system having a multi-cell environment. The method includes acquiring, by a first base station providing a service for a first cell, first CSI of a first downlink channel between the first base station and a mobile station served by the first base station, and transmitting, to a second base station, a signal including information requesting that the second base station providing a service for a second cell acquire second CSI of a second downlink channel between the second base station and the mobile station.

In another aspect of the present invention, provided herein is a method for performing collaborative MIMO in a wideband wireless mobile communication system having a multi-cell environment. The method includes receiving, a first base station providing a service for a first cell, a signal from a second base station, wherein the signal includes information requesting that the first base station acquire CSI of a downlink channel between the first base station and a mobile station served by the second base station providing a service for a second cell, and acquiring, by the first base station, the CSI.

In another aspect of the present invention, provided herein is a method for performing collaborative MIMO in a wideband wireless mobile -communication system having a multi-cell environment. The method includes receiving, by a mobile station served by a first base station providing a service for a first cell, a signal from the first base station, wherein the signal includes information instructing the mobile station to transmit a first sounding signal through a first sounding channel between a first base station and the mobile station and to transmit a second sounding signal, through a second sounding channel between a second base station providing a service for a second cell and the mobile station, and transmitting, by the mobile station, the first and second sounding signals.

According to the present invention, channel state information for performing collaborative MIMO can be efficiently obtained.

DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings.

In some instances, known structures and/or devices are omitted or are shown in block diagram and/or flow chart form, focusing on important features of the structures and/or devices, so as not to obscure the concept of the present invention. The same reference numbers will be used throughout this specification to refer to the same or like parts.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In exemplary embodiments of the present invention, a description is made of a data transmission and reception relationship between a base station and a mobile station. Here, the term 'base station' refers to a terminal node of a network communicating directly with the mobile station. In some cases, a specific operation described as performed by the base station may be performed by an upper node of the base station. Namely, it is apparent that, in a network comprised of a plurality of network nodes including a base station, various operations performed for communication with a mobile station may be performed by the base station, or network nodes other than the base station. The term 'base station' may be replaced with the term 'fixed station', 'Node B', 'eNode B' (eNB), 'access point', etc. The term 'mobile station' may be replaced with the term 'user equipment', 'mobile subscriber station' (MSS), etc.

In a multi-cell environment, users in edges of cells have a reception performance characteristic which is liable to be subject to interference between the cells. Hereinbelow, a detailed method for applying collaborative MIMO is proposed as a method for providing a better service to a user in an edge of a cell under an influence of interference between cells.

Figure 2:
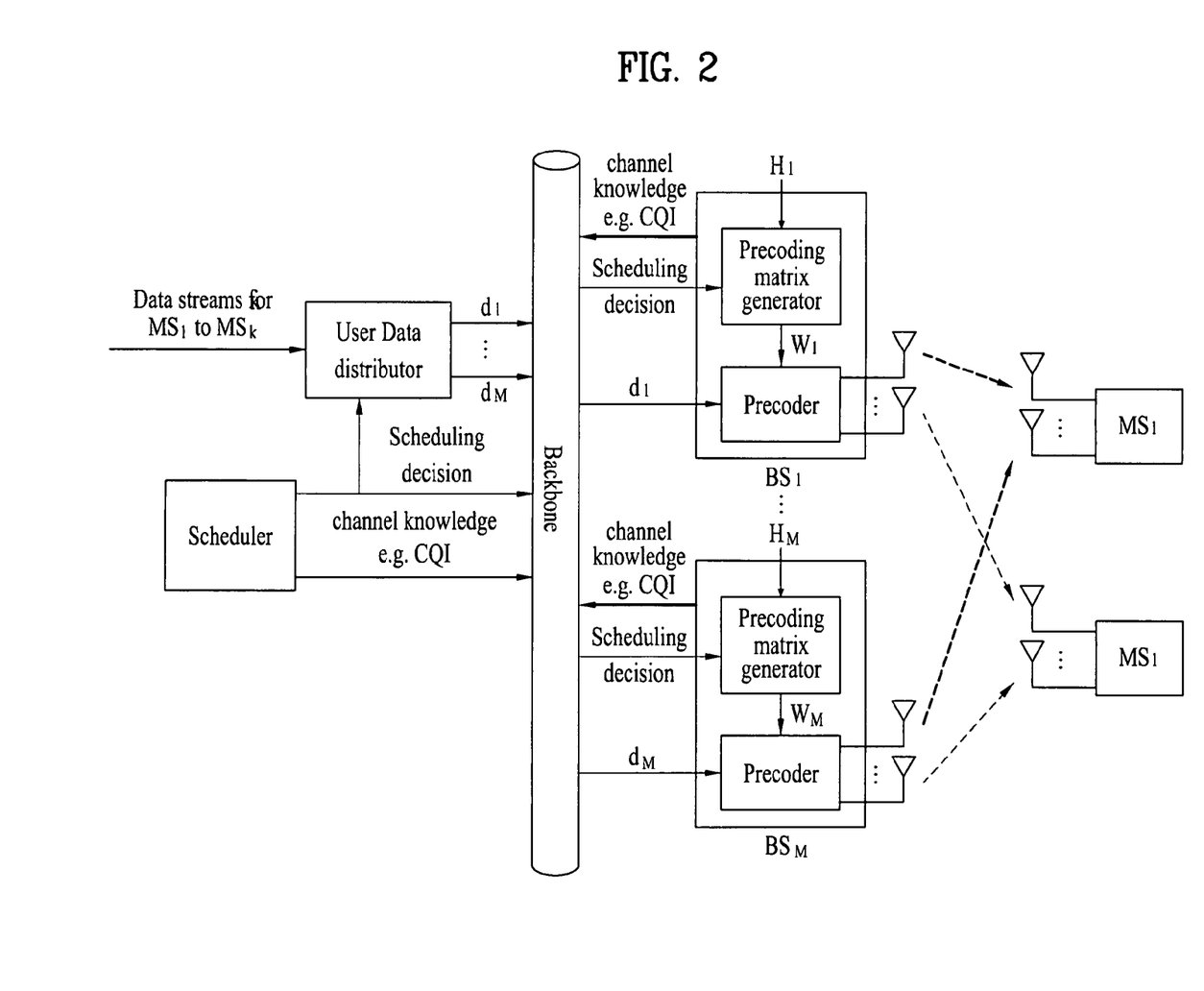
FIG. 2 illustrates an example of collaborative MIMO using a plurality of base stations and codebook-based preceding.

FIG. 2 illustrates an example of collaborative MIMO using a plurality of base stations and codebook-based preceding.

Base stations $BS_1$, $BS_2$, ..., $BS_M$ estimate channels $H_1$, $H_2$ ..., $H_M$ formed from each mobile station and independently generate antenna weight values $W_1$, $W_2$, ..., $W_M$. Each of the antenna weight values is multiplied in a precoder of each base station and then transmitted to each mobile station. Since a plurality of independent streams are transmitted to a plurality of mobile stations or a specific mobile station, multi-user MIMO, single-user MIMO, SDMA, etc. can be achieved.

Figure 3:
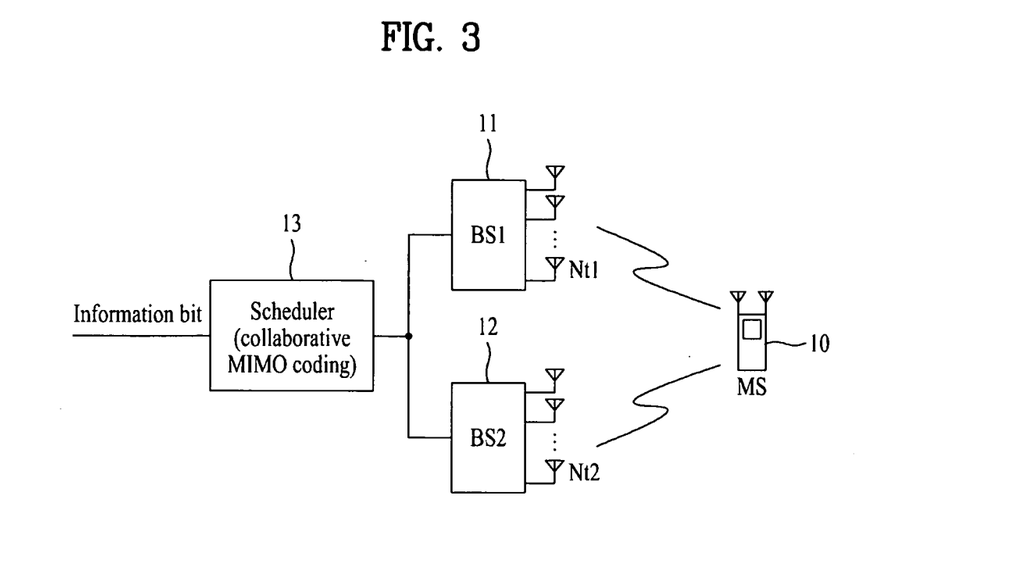
FIG. 3 is a view explaining a method for performing a collaborative MIMO scheme.

FIG. 3 is a view explaining a method for performing a collaborative MIMO scheme.

As illustrated in FIG. 3, a communication system of a multi-cell environment which can apply a collaborative MIMO scheme includes a mobile station (MS) 10, and a plurality of base stations including a serving base station (BS1) 11 receiving uplink data transmitted by the mobile station 10 and a neighbor base station (BS2) 12 in a neighbor cell. The communication system may also include a scheduler 13 scheduling data transmitted to each base station when the plurality of base stations performs collaborative MIMO.

In a similar way of raising reception performance by single-user MIMO or multi-user MIMO through multiple antennas of a base station of a cell, diversity, single-user MIMO, or multi-user MIMO can be achieved by receiving a signal for the same channel from base stations positioned in a plurality of adjacent cells. Especially, when employing this situation, a mobile station which is positioned in an edge of a cell and thus is subject to interference from an adjacent cell may achieve diversity, single-user MIMO, or multi-user MIMO by receiving a signal for the same channel from neighbor base stations.

The scheduler 13 may construct data for a mobile station, especially for a mobile station in the edge of a cell, using various MIMO schemes and transmits the data to the respective base stations in a plurality of adjacent cells, so that the base stations can collaboratively and more effectively transmit a signal to the mobile station. Such a coding scheme in which a plurality of base stations collaboratively transmit a signal to a mobile station is called collaborative MIMO coding. Various conventionally known MIMO schemes may identically or similarly be applied to the collaborative MIMO coding.

The scheduler 13 receives channel information acquired through a signal received by each base station from the mobile station and properly constructs data which is to be transmitted to a corresponding mobile station using the channel information according to a channel state of each base station. The channel information may include, for example, channel quality information (CQI) and rank information (RI). The scheduler 13 may select optimal coding and modulation scheme through the channel information and constructs data using the selected coding and modulation schemes.

When a collaborative MIMO scheme is applied, collaborative MIMO coding is applied to information bits in the scheduler 13 in order to transmit a signal to the mobile station 10 as illustrated in FIG. 3. The coded information bits are separately delivered to the respective base stations 11 and 12. The base stations 11 and 12 modulate the delivered signal and transmit the modulated signal to the mobile station 10.

Figure 4:
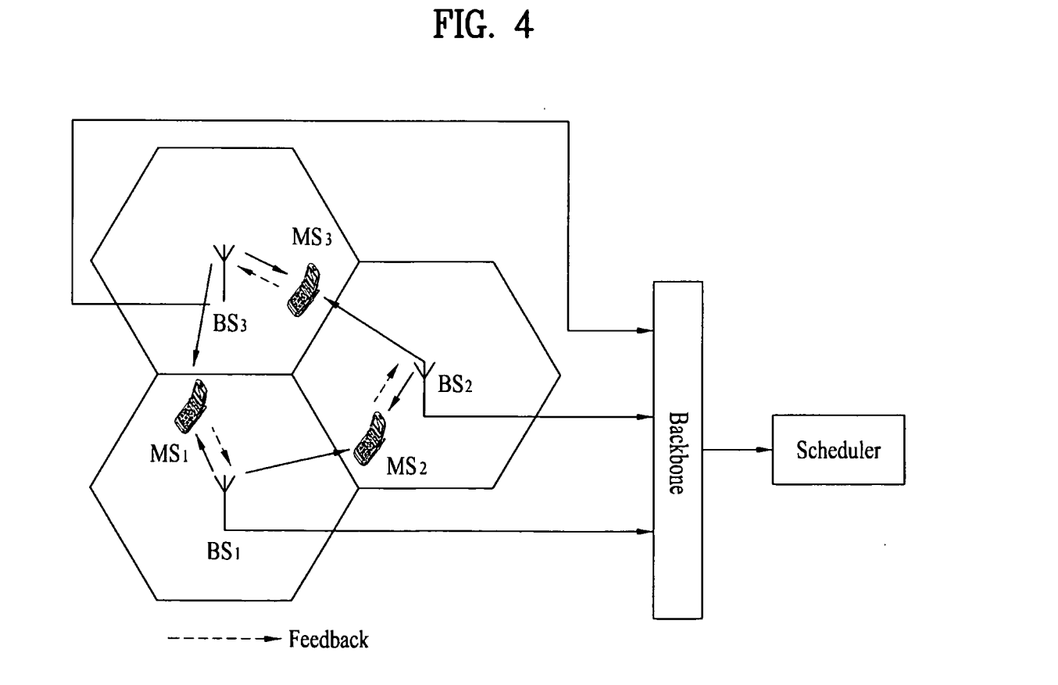
FIG. 4 is a view illustrating a feedback process of data information in a collaborative MIMO system.

FIG. 4 illustrates a feedback process of data information in a collaborative MIMO system.

Referring to FIG. 4, $MS_1$ designates a mobile station belonging to a cell region of a base station $BS_1$, $MS_2$ designates a mobile station belonging to a cell region of a base station $BS_2$, and $MS_3$ designates a mobile station belonging to a cell region of a base station $BS_3$. A 'serving base station' indicates a base station providing a service to a mobile station in each cell region, and a 'collaborative base station' indicates a base station providing a service in a neighbor cell region of each cell region. A serving base station providing a service to a specific mobile station may serve as a collaborative base station providing a collaborative MIMO service with respect to a mobile station receiving a service by another base station.

Each mobile station reports feedback information necessary for a collaborative MIMO operation to each serving base station based on received information. The feedback information reported to the serving base station is further reported to a scheduler through a backbone network. The scheduler instructs collaborative base stations of each serving base station to perform a collaborative MIMO operation based on the received feedback information.

For example, referring to FIG. 4, a plurality of collaborative base stations are connected to the scheduler through the backbone network. The scheduler may receive information about the mobile stations $MS_1$, $MS_2$, and $MS_3$, which is measured by the corresponding serving base stations, and channel information between the base stations, through the backbone network. The scheduler may transmit feedback information for collaborative MIMO to each serving base station and collaborative base stations. In a similar way, the mobile stations $MS_1$ and $MS_2$ can perform collaborative MIMO.

Figure 5:
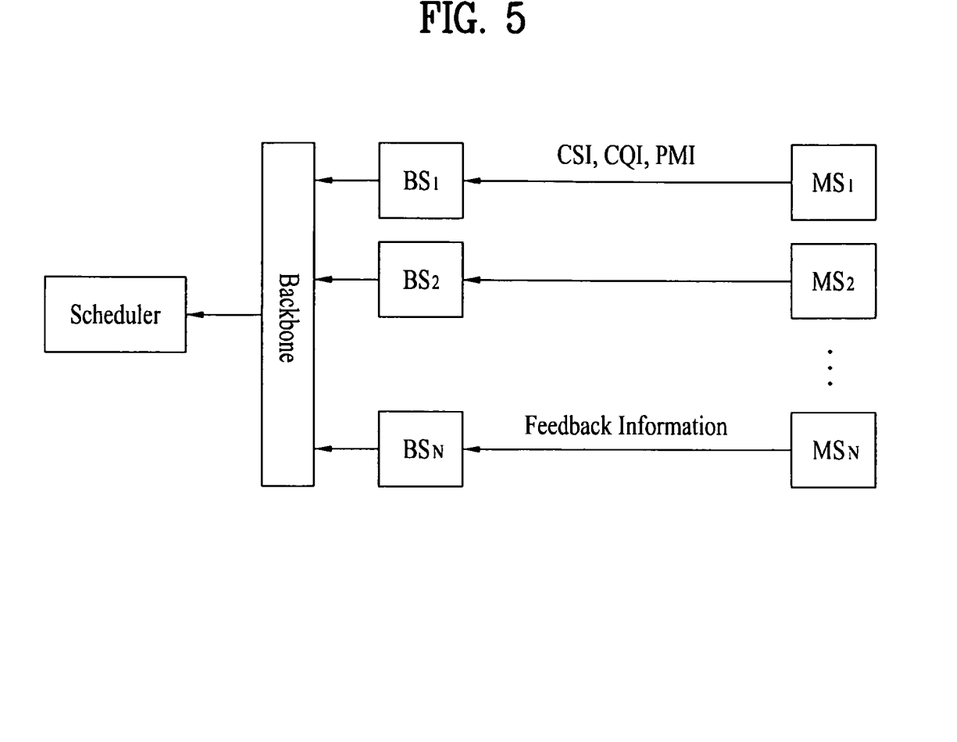
FIG. 5 is a view illustrating a flow of feedback information of collaborative MIMO.

FIG. 5 illustrates a flow of feedback information of collaborative MIMO.

Referring to FIG. 5, each mobile station $MS_1$, $MS_2$, ..., or $MS_N$ transmits feedback information to a corresponding serving base stations $BS_1$, $BS_2$, ..., or $BS_N$. The serving base stations may transmit the feedback information to a scheduler through a backbone network.

The transmitted feedback information may include channel state information (CSI), channel quality indicator (CQI), a preceding matrix index (PMI), a received signal strength indicator (RSSI), etc.

The scheduler can discern relationship between the base stations and the mobile stations using feedback information received through the backbone network. Accordingly, the scheduler can transmit a scheduling decision message through the backbone network to collaborative base stations $BS_1$, $BS_2$, ..., $BS_N$. The collaborative base station can feed back, by the scheduling decision message transmitted to the base station, channel information of mobile stations to which a service is provided. That is, each base station estimates an independent preceding matrix based on the feedback channel information, thereby performing SDMA.

Figure 6:
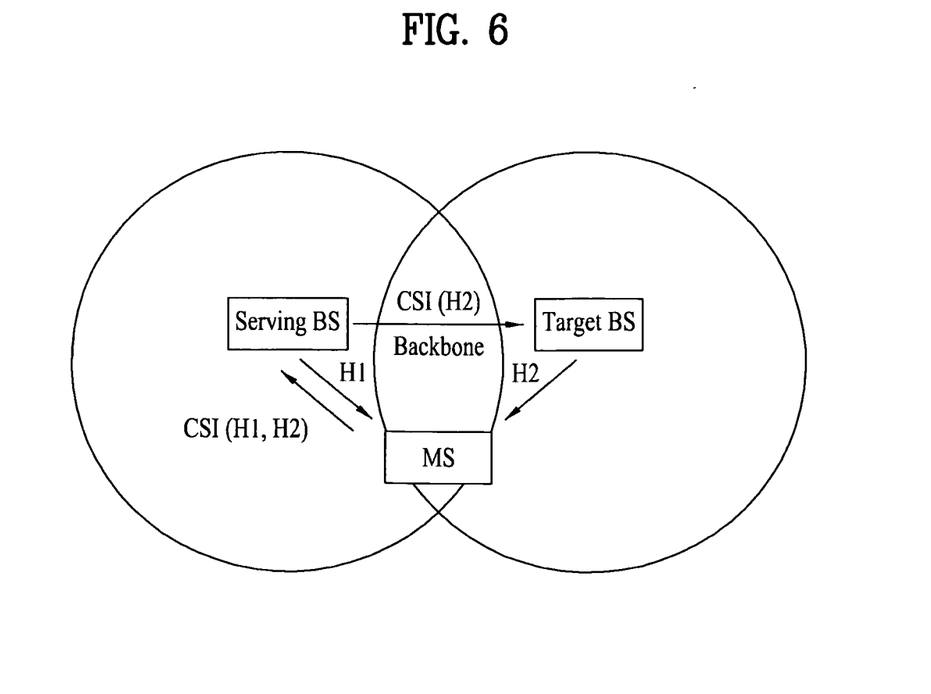
FIG. 6 is a view illustrating a CSI transmission scheme according to a prior art.

FIG. 6 illustrates a CSI transmission scheme according to a prior art.

To achieve collaborative MIMO, a mobile station should measure CSI (H2) of a collaborative base station, which may also be referred to as "a target base station", as well as CSI (H1) of a serving base station, for transmission to the serving base station. The serving base station transmits the CSI (H2) of the target base station through a backbone network, thereby performing closed-loop collaborative MIMO.

In this case, since both the CSI of the target base station and the CSI of the serving base station are transmitted, feedback overhead is increased.

The feedback overhead for collaborative MIMO can be reduced by a method using uplink channel sounding according to exemplary embodiments of the present invention.

Uplink channel sounding is one means for providing channel response information to a base station in a time division duplexing (TDD) system. A transmission antenna array technique, such as adaptive beamforming, downlink SDMA, and closed-loop MIMO, is possible due to the uplink channel sounding. The uplink channel sounding is used in IEEE 802.16e standard.

Uplink channel sounding, which is one means for providing channel response information to a base station when necessary, can be achieved because uplink and downlink are symmetrical in a TDD system.

A base station may inform a mobile station of the fact that a 'sounding zone' can be used and a characteristic of the sounding zone, through a downlink message. If successive sounding is demanded, the base station instructs the mobile station to periodically transmit a sounding signal, thereby reducing overhead of a message used for instruction of the sounding signal.

If the sounding signal is transmitted, the base station can measure a channel response using a typical channel measurement method. This method can reduce channel measurement latency in the TDD system compared with other feedback methods. Moreover, in this method, since the complexity of the base station compared with the mobile station is increased, the complexity of the mobile station can be reduced.

Figure 7:
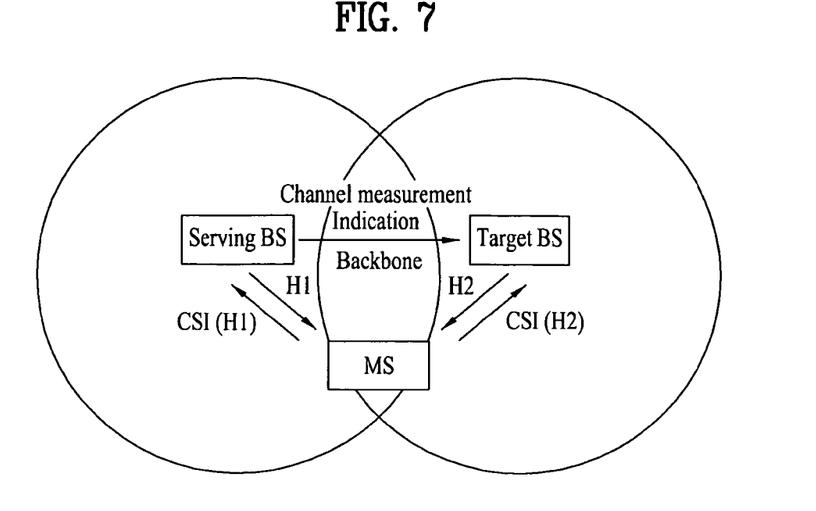
FIG. 7 is a view illustrating a method for a serving base station and a collaborative base station to obtain CSI of a mobile station according to an exemplary embodiment of the present invention.

FIG. 7 illustrates a method for a serving base station and a collaborative base station to obtain CSI of a mobile station according to an exemplary embodiment of the present invention.

A method for each base station to obtain CSI of a mobile station may be as follows. A serving base station schedules the mobile station to transmit a sounding signal using a unique sounding channel of the mobile station to a serving base station and a target base station. In addition, the serving base station may transmit, to the target base station, a request to measure a channel state between the target base station and the mobile station using the sounding signal transmitted by the mobile station.

Next, the mobile station may transmit the sounding signal to the serving base station and the target base station using a unique sounding channel. Then the serving base station can obtain CSI (H1) of a downlink channel H1 between the serving base station and the mobile station using the received sounding signal. The target base station can obtain CSI (H2) of a downlink channel H2 between the target base station and the mobile station using the received sounding signal. The obtained CSI may be used for target MIMO.

The description of FIG. 7 may be applied when a TDD mode is used. If a frequency division duplexing (FDD) mode is used, the following steps may be performed.

The serving base station may request the target base station to measure CSI of a downlink channel between the mobile station and the target station based on a channel obtained in an uplink. Then the serving base station can calculate CSI of a downlink channel Hi between the serving base station and the mobile station based on the uplink channel between the serving base station and the mobile station. The target base station can calculate CSI of a downlink channel H2 between the target base station and the mobile station based on the uplink channel between the target base station and the mobile station. The obtained CSI may be used for collaborative MIMO.

Figure 8:
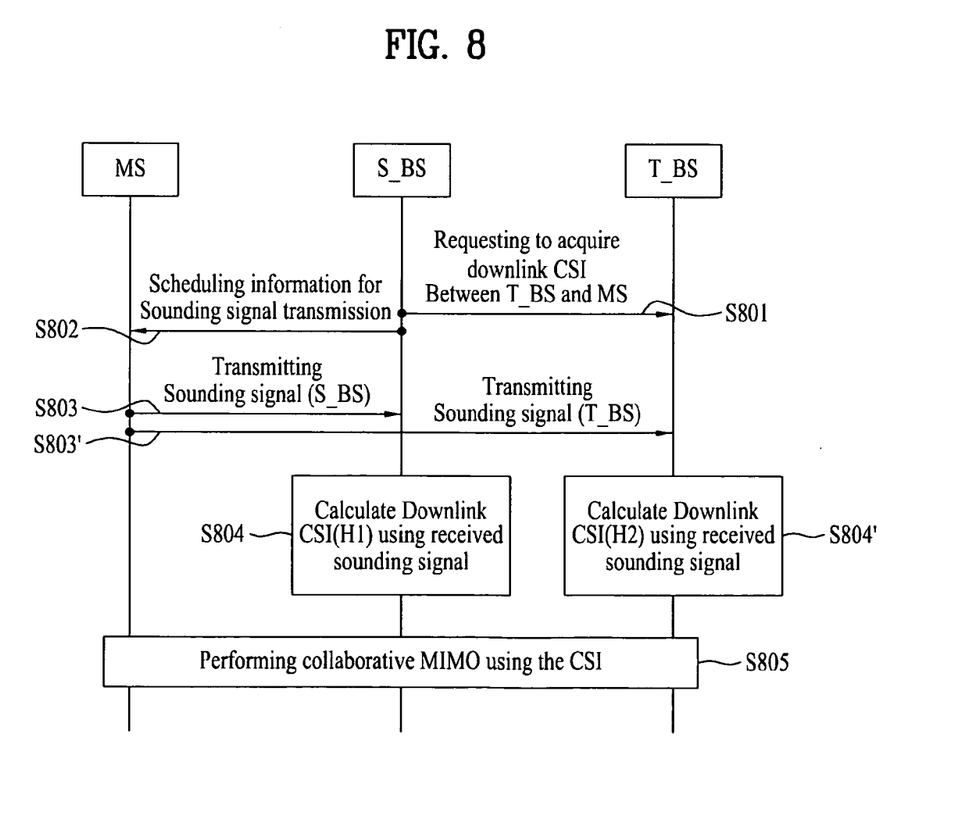
FIG. 8 is a flow chart illustrating a signal flow according to an exemplary embodiment of the present invention.

FIG. 8 is a flow chart illustrating a signal flow according to an exemplary embodiment of the present invention.

In step S801, a serving base station S_BS requests that a target base station T_BS acquire downlink CSI used for collaborative MIMO. Here, the downlink CSI indicates CSI between the target base station T_BS and the mobile station, and the mobile station receives a service from the serving base station S_BS. In step S802, the serving base station S_BS transmits a scheduling signal requesting or instructing the mobile station belonging to the serving base station S_BS to transmit a sounding signal. In steps S803 and S803', the mobile station transmits the sounding signal to the serving base station S_BS and the target base station T_BS, respectively. In step S804, the serving base station S_BS determines CSI (H1) of a downlink channel H1 between the serving base station S_BS and the mobile station based on the received sounding signal. In step S804', the target base station T_BS determines CSI (H2) of a downlink channel H2 between the target base station T_BS and the mobile station MS based on the received sounding signal. The sounding signal received by the serving base station S_BS is the same as the sounding signal received by the target base station T_BS.

The determined CSI may be used to perform collaborative MIMO in step S805. In more detail, specific base stations related to collaborative MIMO transmission coordination including the serving base station S_BS and the target base station T_BS may calculate a multi-user preceding matrix of mobile stations concerning the collaborative MIMO transmission coordination using the determined CSI. The base station may transmit the same signal or an independent signal to the mobile stations by a collaborative MIMO scheme using the multi-user precoding matrix.

FIG. 8 is based on a mobile communication system operated in a TDD mode. When an FDD mode is used, steps S802 and S803 may be omitted. In steps S804 and S804', the base station may estimate CSI of a downlink channel based on an uplink channel between each base station and the mobile station, rather than generating CSI based on the sounding signal.

The CSI obtained through the above embodiments may be used for beamforming as well as collaborative MIMO.

According to the present invention, CSI for collaborative MIMO can be efficiently acquired. Especially, transmission overhead necessary for transmitting CSI from the mobile station to the base station can be reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. Further, the present invention may be embodied by a combination of claims which do not have an explicit cited relation in the appended claims or may include new claims by amendment after application.

The present invention is applicable to a wireless mobile communication system using collaborative MIMO.

What is claimed is:

1. A method for receiving, at a mobile station, a signal by a collaborative multiple-input multiple-output (Co-MIMO) scheme in a multi-cell environment, the method comprising:
configuring a sounding zone for the Co-MIMO scheme;
transmitting a sounding signal to a serving base station via the sounding zone for the Co-MIMO scheme, wherein one or more adjacent base stations receive the sounding signal; and
receiving signals precoded by using a multiuser precoding matrix via the sounding zone for the Co-MIMO scheme,
wherein according to the Co-MIMO scheme, one or more mobile stations including the mobile station are served jointly by a plurality of base stations including the serving base station and the one or more adjacent base stations,
wherein the serving base station and the one or more adjacent base stations determine the multiuser precoding matrix for the one or more mobile stations based on the sounding signal,
wherein the serving base station calculates channel state information of a downlink channel between the serving base station and the one or more mobile stations based on an uplink channel, and the obtained channel state information is used for the Co-MIMO scheme and for beamforming.

2. The method according to claim 1, the sounding signal is a means for providing channel response to the serving base station and the one or more adjacent base stations.

3. A method for transmitting, at a serving base station, a signal by a collaborative multiple-input multiple-output (Co-MIMO) scheme in a multi-cell environment, the method comprising:
configuring a sounding zone for the Co-MIMO scheme;
receiving sounding signals from one or more mobile stations, via the sounding zone for the Co-MIMO scheme;
determining a multiuser precoding matrix for the one or more mobile stations based on the sounding signals;
precoding signals by using the multiuser precoding matrix; and
transmitting the precoded signals to the one or more mobile stations via the sounding zone for the Co-MIMO scheme,
wherein, according to the Co-MIMO scheme, the one or more mobile stations are served jointly by a plurality of base stations,
wherein one or more adjacent base stations receive the sounding signals, determine the multiuser precoding matrix for the one or more mobile stations and precode signals by using the multiuser procoding matrix,
wherein the serving base station calculates channel state information of a downlink channel between the serving base station and the one or more mobile stations based on an uplink channel, and the obtained channel state information is used for the Co-MIMO scheme and for beamforming.

* * * * *